United States Patent
Moore

(10) Patent No.: US 11,418,487 B2
(45) Date of Patent: Aug. 16, 2022

(54) FILTERING NETWORK DATA TRANSFERS

(71) Applicant: Centripetal Networks, Inc., Portsmouth, NH (US)

(72) Inventor: Sean Moore, Hollis, NH (US)

(73) Assignee: Centripetal Networks, Inc., Portsmouth, NH (US)

( * ) Notice: Subject to any disclaimer, the term of this patent is extended or adjusted under 35 U.S.C. 154(b) by 0 days.

(21) Appl. No.: 17/246,854

(22) Filed: May 3, 2021

(65) Prior Publication Data

US 2021/0258285 A1    Aug. 19, 2021

Related U.S. Application Data

(63) Continuation of application No. 16/945,981, filed on Aug. 3, 2020, now Pat. No. 11,012,415, which is a
(Continued)

(51) Int. Cl.
*H04L 29/06* (2006.01)
*H04L 9/40* (2022.01)
(Continued)

(52) U.S. Cl.
CPC .......... *H04L 63/0254* (2013.01); *H04L 45/74* (2013.01); *H04L 63/0263* (2013.01);
(Continued)

(58) Field of Classification Search
None
See application file for complete search history.

(56) References Cited

U.S. PATENT DOCUMENTS

| 6,098,172 A | 8/2000 | Coss et al. |
| 6,147,976 A | 11/2000 | Shand et al. |

(Continued)

FOREIGN PATENT DOCUMENTS

| AU | 2005328336 B2 | 9/2011 |
| AU | 2006230171 B2 | 6/2012 |

(Continued)

OTHER PUBLICATIONS

U.S. Appl. No. 13/795,822, filed Mar. 12, 2013.
(Continued)

*Primary Examiner* — Anh Ngoc M Nguyen
(74) *Attorney, Agent, or Firm* — Banner & Witcoff, Ltd.

(57) ABSTRACT

Aspects of this disclosure relate to filtering network data transfers. In some variations, multiple packets may be received. A determination may be made that a portion of the packets have packet header field values corresponding to a packet filtering rule. Responsive to such a determination, an operator specified by the packet filtering rule may be applied to the portion of packets having the packet header field values corresponding to the packet filtering rule. A further determination may be made that one or more of the portion of the packets have one or more application header field values corresponding to one or more application header field criteria specified by the operator. Responsive to such a determination, at least one packet transformation function specified by the operator may be applied to the one or more of the portion of the packets.

21 Claims, 4 Drawing Sheets

218

Five-tuple

| Rule # | IP Protocol | Source IP Address | Source Port | Destination IP Address | Destination Port | Operator |
|---|---|---|---|---|---|---|
| 1 (302) | TCP | 140.210.* | * | 140.212.* | 22 | ALLOW |
| 2 (304) | TCP | 140.210.* | * | 140.212.* | 25 | ALLOW |
| 3 (306) | TCP | 140.210.* | * | 140.212.* | 110 | ALLOW |
| 4 (308) | TCP | 140.210.* | * | 140.212.* | 143 | ALLOW |
| 5 (310) | TCP | 140.210.* | * | 140.212.* | 443 | REQUIRE-TLS-1.1-1.2 |
| 6 (312) | TCP | 140.210.* | * | 214.* | 80 | HTTP-EXFIL |
| 7 (314) | * | * | * | * | * | BLOCK |

Related U.S. Application Data continuation of application No. 16/791,044, filed on Feb. 14, 2020, now Pat. No. 10,735,380, which is a continuation of application No. 15/614,956, filed on Jun. 6, 2017, now Pat. No. 10,567,343, which is a continuation of application No. 14/625,486, filed on Feb. 18, 2015, now Pat. No. 9,686,193, which is a continuation of application No. 13/795,822, filed on Mar. 12, 2013, now Pat. No. 9,124,552.

(51) Int. Cl.
*H04L 45/74* (2022.01)
*H04L 69/22* (2022.01)
*H04L 67/02* (2022.01)

(52) U.S. Cl.
CPC .......... *H04L 63/1466* (2013.01); *H04L 67/02* (2013.01); *H04L 69/22* (2013.01)

(56) References Cited

U.S. PATENT DOCUMENTS

| | | | |
|---|---|---|---|
| 6,226,372 B1 | 5/2001 | Beebe et al. |
| 6,279,113 B1 | 8/2001 | Vaidya |
| 6,317,837 B1 | 11/2001 | Kenworthy |
| 6,484,261 B1 | 11/2002 | Wiegel |
| 6,611,875 B1 | 8/2003 | Chopra et al. |
| 6,662,235 B1 | 12/2003 | Callis et al. |
| 6,678,827 B1 | 1/2004 | Rothermel et al. |
| 6,826,694 B1 | 11/2004 | Dutta et al. |
| 6,907,042 B1 | 6/2005 | Oguchi |
| 6,971,028 B1 | 11/2005 | Lyle et al. |
| 7,032,031 B2 | 4/2006 | Jungck et al. |
| 7,089,581 B1 | 8/2006 | Nagai et al. |
| 7,095,716 B1 | 8/2006 | Ke et al. |
| 7,107,613 B1 | 9/2006 | Chen et al. |
| 7,143,438 B1 | 11/2006 | Coss et al. |
| 7,152,240 B1 | 12/2006 | Green et al. |
| 7,185,368 B2 | 2/2007 | Copeland, III |
| 7,215,637 B1 | 5/2007 | Ferguson et al. |
| 7,225,269 B2 | 5/2007 | Watanabe |
| 7,227,842 B1 | 6/2007 | Ji et al. |
| 7,237,267 B2 | 6/2007 | Rayes et al. |
| 7,263,099 B1 | 8/2007 | Woo et al. |
| 7,296,288 B1 | 11/2007 | Hill et al. |
| 7,299,353 B2 | 11/2007 | Le Pennec et al. |
| 7,331,061 B1 | 2/2008 | Ramsey et al. |
| 7,478,429 B2 | 1/2009 | Lyon |
| 7,499,412 B2 | 3/2009 | Matityahu et al. |
| 7,539,186 B2 | 5/2009 | Aerrabotu et al. |
| 7,586,899 B1 | 9/2009 | Mohaban et al. |
| 7,610,621 B2 | 10/2009 | Turley et al. |
| 7,684,400 B2 | 3/2010 | Govindarajan et al. |
| 7,710,885 B2 | 5/2010 | Ilnicki et al. |
| 7,721,084 B2 | 5/2010 | Salminen et al. |
| 7,792,775 B2 | 9/2010 | Matsuda |
| 7,814,158 B2 | 10/2010 | Malik |
| 7,814,546 B1 | 10/2010 | Strayer et al. |
| 7,818,794 B2 | 10/2010 | Wittman |
| 7,849,502 B1 | 12/2010 | Bloch et al. |
| 7,900,042 B2 | 3/2011 | Hall et al. |
| 7,913,303 B1 | 3/2011 | Rouland et al. |
| 7,954,143 B2 | 5/2011 | Aaron |
| 8,004,994 B1 | 8/2011 | Darisi et al. |
| 8,009,566 B2 | 8/2011 | Zuk et al. |
| 8,037,517 B2 | 10/2011 | Fulp et al. |
| 8,042,167 B2 | 10/2011 | Fulp et al. |
| 8,117,655 B2 | 2/2012 | Spielman |
| 8,156,206 B2 | 4/2012 | Kiley et al. |
| 8,176,561 B1 | 5/2012 | Hurst et al. |
| 8,214,429 B2 | 7/2012 | Chidel et al. |
| 8,219,675 B2 | 7/2012 | Ivershen |
| 8,271,645 B2 | 9/2012 | Rajan et al. |
| 8,306,994 B2 | 11/2012 | Kenworthy |
| 8,307,029 B2 | 11/2012 | Davis et al. |
| 8,331,234 B1 | 12/2012 | Newton et al. |
| 8,370,936 B2 | 2/2013 | Zuk et al. |
| 8,422,391 B2 | 4/2013 | Zhu |
| 8,495,725 B2 | 7/2013 | Ahn |
| 8,510,821 B1 | 8/2013 | Brandwine et al. |
| 8,726,379 B1 | 5/2014 | Stiansen et al. |
| 8,789,135 B1 | 7/2014 | Pani |
| 8,806,638 B1 | 8/2014 | Mani |
| 8,832,832 B1 | 9/2014 | Visbal |
| 8,856,926 B2 | 10/2014 | Narayanaswamy et al. |
| 8,935,785 B2 | 1/2015 | Pandrangi |
| 9,055,093 B2 | 6/2015 | Borders |
| 9,094,445 B2 | 7/2015 | Moore et al. |
| 9,124,552 B2 | 9/2015 | Moore |
| 9,137,205 B2 | 9/2015 | Rogers et al. |
| 9,154,446 B2 | 10/2015 | Gemelli et al. |
| 9,160,713 B2 | 10/2015 | Moore |
| 9,172,627 B2 | 10/2015 | Kjendal et al. |
| 9,413,722 B1 | 8/2016 | Ahn et al. |
| 9,419,942 B1 | 8/2016 | Buruganahalli et al. |
| 9,503,529 B2 | 11/2016 | Li et al. |
| 9,531,672 B1 | 12/2016 | Li et al. |
| 9,634,911 B2 | 4/2017 | Meloche |
| 9,686,193 B2 | 6/2017 | Moore |
| 10,567,343 B2 | 2/2020 | Moore |
| 10,735,380 B2 | 8/2020 | Moore |
| 2001/0039579 A1 | 11/2001 | Trcka et al. |
| 2001/0039624 A1 | 11/2001 | Kellum |
| 2002/0016858 A1 | 2/2002 | Sawada et al. |
| 2002/0038339 A1 | 3/2002 | Xu |
| 2002/0049899 A1 | 4/2002 | Kenworthy |
| 2002/0083345 A1 | 6/2002 | Halliday et al. |
| 2002/0112188 A1 | 8/2002 | Syvanne |
| 2002/0152209 A1 | 10/2002 | Merugu et al. |
| 2002/0164962 A1 | 11/2002 | Mankins et al. |
| 2002/0165949 A1 | 11/2002 | Na et al. |
| 2002/0186683 A1 | 12/2002 | Buck et al. |
| 2002/0198981 A1 | 12/2002 | Corl et al. |
| 2003/0005122 A1* | 1/2003 | Freimuth ................ H04L 29/06 706/225 |
| 2003/0014665 A1 | 1/2003 | Anderson et al. |
| 2003/0018591 A1 | 1/2003 | Komisky |
| 2003/0035370 A1 | 2/2003 | Brustoloni |
| 2003/0051026 A1 | 3/2003 | Carter et al. |
| 2003/0088787 A1 | 5/2003 | Egevang |
| 2003/0097590 A1 | 5/2003 | Syvanne |
| 2003/0105976 A1 | 6/2003 | Copeland |
| 2003/0120622 A1 | 6/2003 | Nurmela et al. |
| 2003/0123456 A1 | 7/2003 | Denz et al. |
| 2003/0142681 A1 | 7/2003 | Chen et al. |
| 2003/0145225 A1 | 7/2003 | Bruton et al. |
| 2003/0154297 A1 | 8/2003 | Suzuki et al. |
| 2003/0154399 A1 | 8/2003 | Zuk et al. |
| 2003/0188192 A1 | 10/2003 | Tang et al. |
| 2003/0212900 A1 | 11/2003 | Liu et al. |
| 2003/0220940 A1 | 11/2003 | Futoransky et al. |
| 2004/0010712 A1 | 1/2004 | Hui et al. |
| 2004/0015719 A1 | 1/2004 | Lee et al. |
| 2004/0073655 A1 | 4/2004 | Kan et al. |
| 2004/0088542 A1 | 5/2004 | Daude et al. |
| 2004/0093513 A1 | 5/2004 | Cantrell et al. |
| 2004/0098511 A1 | 5/2004 | Lin et al. |
| 2004/0114518 A1 | 6/2004 | MacFaden et al. |
| 2004/0123220 A1 | 6/2004 | Johnson et al. |
| 2004/0131056 A1 | 7/2004 | Dark |
| 2004/0148520 A1 | 7/2004 | Talpade et al. |
| 2004/0151155 A1 | 8/2004 | Jouppi |
| 2004/0172529 A1 | 9/2004 | Culbert |
| 2004/0172557 A1 | 9/2004 | Nakae et al. |
| 2004/0177139 A1 | 9/2004 | Schuba et al. |
| 2004/0181690 A1 | 9/2004 | Rothermel et al. |
| 2004/0193943 A1 | 9/2004 | Angelino et al. |
| 2004/0199629 A1 | 10/2004 | Bomer et al. |
| 2004/0205360 A1 | 10/2004 | Norton et al. |
| 2004/0250124 A1 | 12/2004 | Chesla et al. |
| 2005/0010765 A1 | 1/2005 | Swander et al. |
| 2005/0024189 A1 | 2/2005 | Weber |
| 2005/0071650 A1 | 3/2005 | Jo et al. |
| 2005/0076227 A1 | 4/2005 | Kang et al. |

(56) References Cited

U.S. PATENT DOCUMENTS

| | | |
|---|---|---|
| 2005/0083935 A1 | 4/2005 | Kounavis et al. |
| 2005/0108557 A1 | 5/2005 | Kayo et al. |
| 2005/0114704 A1 | 5/2005 | Swander |
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0182950 A1 | 8/2005 | Son et al. |
| 2005/0183140 A1 | 8/2005 | Goddard |
| 2005/0229246 A1 | 10/2005 | Rajagopal et al. |
| 2005/0249214 A1 | 11/2005 | Peng |
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0118894 A1 | 5/2007 | Bhatia |
| 2007/0147380 A1 | 6/2007 | Ormazabal et al. |
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1* | 9/2008 | Blaisdell ............ H04L 63/102 726/1 |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0028160 A1 | 1/2009 | Eswaran et al. |
| 2009/0103524 A1 | 4/2009 | Mantripragada et al. |
| 2009/0138938 A1 | 5/2009 | Harrison et al. |
| 2009/0144819 A1 | 6/2009 | Babbar et al. |
| 2009/0150972 A1 | 6/2009 | Moon et al. |
| 2009/0172800 A1 | 7/2009 | Wool |
| 2009/0204688 A1 | 8/2009 | Britton et al. |
| 2009/0222877 A1 | 9/2009 | Diehl et al. |
| 2009/0240698 A1 | 9/2009 | Shukla et al. |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1* | 3/2011 | Ahn ..................... G06F 21/562 726/13 |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0154470 A1 | 6/2011 | Grimes et al. |
| 2011/0185055 A1 | 7/2011 | Nappier et al. |
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2012/0023576 A1 | 1/2012 | Sorensen et al. |
| 2012/0057591 A1 | 3/2012 | Erman et al. |
| 2012/0084866 A1 | 4/2012 | Stolfo |
| 2012/0106354 A1 | 5/2012 | Pleshek et al. |
| 2012/0110656 A1 | 5/2012 | Santos et al. |
| 2012/0113987 A1 | 5/2012 | Riddoch et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0314617 A1 | 12/2012 | Erichsen et al. |
| 2012/0331543 A1 | 12/2012 | Bostrom et al. |
| 2013/0007257 A1 | 1/2013 | Ramaraj et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0254766 A1 | 9/2013 | Zuo et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0245423 A1 | 8/2014 | Lee |
| 2014/0259170 A1 | 9/2014 | Amsler |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0317737 A1 | 10/2014 | Shin et al. |
| 2014/0337613 A1 | 11/2014 | Martini |
| 2014/0365372 A1 | 12/2014 | Ross et al. |
| 2014/0366132 A1 | 12/2014 | Stiansen et al. |
| 2015/0033336 A1 | 1/2015 | Wang et al. |
| 2015/0052601 A1 | 2/2015 | White et al. |
| 2015/0106930 A1 | 4/2015 | Honda et al. |
| 2015/0128274 A1 | 5/2015 | Giokas |
| 2015/0135325 A1 | 5/2015 | Stevens et al. |
| 2015/0207809 A1 | 7/2015 | Macaulay |
| 2015/0237012 A1 | 8/2015 | Moore |
| 2015/0244734 A1 | 8/2015 | Olson et al. |
| 2015/0256431 A1 | 9/2015 | Buchanan et al. |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0347246 A1 | 12/2015 | Matsui et al. |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0028751 A1 | 1/2016 | Mota et al. |
| 2016/0065611 A1 | 3/2016 | Fakeri-Tabrizi et al. |
| 2016/0112443 A1 | 4/2016 | Grossman et al. |

(56) References Cited

U.S. PATENT DOCUMENTS

| | | |
|---|---|---|
| 2016/0119365 A1 | 4/2016 | Barel |
| 2016/0127417 A1 | 5/2016 | Janssen |
| 2016/0191558 A1 | 6/2016 | Davison |
| 2016/0205069 A1 | 7/2016 | Blocher et al. |
| 2016/0219065 A1 | 7/2016 | Dasgupta et al. |
| 2016/0285706 A1 | 9/2016 | Rao |
| 2016/0294870 A1 | 10/2016 | Banerjee et al. |
| 2016/0366099 A1 | 12/2016 | Jordan |
| 2017/0223046 A1 | 8/2017 | Singh |
| 2017/0272469 A1 | 9/2017 | Kraemer et al. |

FOREIGN PATENT DOCUMENTS

| | | | |
|---|---|---|---|
| CA | 2600236 | A1 | 10/2006 |
| EP | 1006701 | A2 | 6/2000 |
| EP | 1313290 | A1 | 5/2003 |
| EP | 1484884 | A2 | 12/2004 |
| EP | 1677484 | A2 | 7/2006 |
| EP | 2385676 | A1 | 11/2011 |
| EP | 2498442 | A1 | 9/2012 |
| EP | 1864226 | B1 | 5/2013 |
| KR | 20010079361 | A | 8/2001 |
| KR | 10-2009-0076556 | A | 7/2009 |
| WO | 2005046145 | A1 | 5/2005 |
| WO | 2005/101761 | A1 | 10/2005 |
| WO | 2006093557 | A2 | 9/2006 |
| WO | 2006105093 | A2 | 10/2006 |
| WO | 2007109541 | A2 | 9/2007 |
| WO | 2011038420 | A2 | 3/2011 |
| WO | 2012146265 | A1 | 11/2012 |

OTHER PUBLICATIONS

U.S. Appl. No. 14/625,486, filed Feb. 18, 2015.
U.S. Appl. No. 14/702,755, filed May 3, 2015.
U.S. Appl. No. 15/614,956, filed Jun. 6, 2017.
U.S. Appl. No. 16/448,997, filed Jun. 21, 2019.
U.S. Appl. No. 16/781,044, filed Feb. 14, 2020.
U.S. Appl. No. 16/945,981, filed Aug. 3, 2020.
Jul. 5, 2018 U.S. Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 2, 20185 U.S. Notice of Allowance—U.S. Appl. No. 15/413,834.
Sep. 4, 2018 (WO) International Search Report and Written Opinion—App. PCT/US2018/041355.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE INFOCOM, 1203-1212, 2000.
Acharya et al., "OPTWALL: A Hierarchical Traffic-Aware Firewall," Department of Computer Science, Telecommunications Program, University of Pittsburgh, pp. 1-11 (2007).
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Bellion, "High Performance Packet Classification", http://www.hipac.org (Publication Date Unknown).
Blake, et al., "An Architecture for Differentiated Services," Network Working Group RFC 2475, Dec. 1998, 36 pages.
C. Benecke, "A Parallel Packet Screen for High Speed Networks", Proceedings of the 15th Annual Computer Security Applications Conference, 1999.
Chen, et al., "Research on the Anomaly Discovering Algorithm of the Packet Filtering Rule Sets," Sep. 2010, First International Confererence on Pervasive Computing, Signal Processing and Applications, pp. 362-366.
D. Comer, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P-Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with SURF"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1):22-35,1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
M. Al-Suwaiyel et al., "Algorithms for Trie Compaction", ACM Transactions on Database Systems, 9(2): 243-263, Jun. 1984.
M. Christiansen et al., "Using IDDsfor Packet Filtering," Technical Report, BRICS, Oct. 2002.
M. Degermark et al., "Small Forwarding Tables for Fast Routing Lookups", Proceedings of ACM SIGCOMM, 4-13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al, "Definition of the Differentiated Services Field (DS Field) in the IPv4 and IPv6 Headers," Network Working Group RFC 2474, Dec. 1998, 20 pages.
O. Paul et al., "A full Bandwidth ATM Firewall", Proceedings of the 6th European Symposium on Research in Computer Security ESORICS'2000, 2000.

(56) References Cited

OTHER PUBLICATIONS

P. Warkhede et al., "Fast Packet Classification for Two-Dimensional Conflict-Free Filters", Proceedings of IEEE INFOCOM, 1434-1443, 2001.
Palo Alto Networks; "Designing A Zero Trust Network With Next-Generation Firewalls"; pp. 1-10; last viewed on Oct. 21, 2012.
Perkins, "IP Encapsulation with IP," Network Working Group RFC 2003, Oct. 1996, 14 pages.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5:287-326, 1979.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
Dec. 5, 2016—U.S. Notice of Allowance—U.S. Appl. No. 14/714,207.
Feb. 2, 20164—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691 (007742.00064).
Aug. 21, 2017 (AU) First Examination Report—App. 2015248067.
Feb. 10, 2017—U.S. Notice of Allowance—U.S. Appl. No. 14/625,486.
Feb. 15, 2017—U.S. Notice of Allowance—U.S. Appl. No. 14/921,718.
Jul. 20, 2017 (US) Complaint for Patent Infringement—Case No. 2:17-cv-00383-HCN-LRL, Document 1, 38 pages.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 5, 2017 (US) Defendant Ixia's Partial Answer to Complaint for Patent Infringement—Case No. 2-17-cv-00383-HCN-LRL, Document 29, 14 pages.
Sep. 5, 2017 (US) Memorandum in Support of Defendant's Ixia and Keysight Technologies, Inc's Motion to Dismiss for Unpatentability Under 35 U.S.C. § 101—Case No. 2:17-cv-00383-HCM-LRL, Document 21, 29 pages.
Sep. 5, 2017 (US) Request for Judicial Notice in Support of Defendants Ixia and Keysight Technologies, Inc's Motion to Dismiss for Unpatentability under 35 U.S.C § 101—Case No. 2:17-cv-00383-HCN-LRL, Document 22, 3 pages.
Sep. 29, 2017 (CA) Examination Report—App. 2,772,630.
Apr. 17, 2018 U.S. Non-Final Office Action—U.S. Appl. No. 15/610,995.
Aug. 9, 2018 U.S. Non-Final Office Action—U.S. Appl. No. 15/413,947.
Jul. 11, 2018 (US) Declaration of Kevin Jeffay, PhD in Support of Petition for Inter Partes Review of U.S. Pat. No. 9,565,213—IPR2018-01386.
Jul. 12, 2018 (US) Petition for Inter Partes Review of U.S. Pat. No. 9,565,213—IPR2018-01386.
Jul. 13, 2018 U.S. Notice of Allowance—U.S. Appl. No. 15/414,117.
Jul. 20, 2018 (US) Declaration of Dr. Stuart Staniford in Support of Petition for Inter Partes Review of U.S. Pat. No. 9,124,552—IPR2018-01436.
Jul. 20, 2018 (US) Declaration of Dr. Stuart Staniford in Support of Petition for Inter Partes Review of U.S. Pat. No. 9,160,713—IPR2018-01437.
Jul. 20, 2018 (US) Petition for Inter Partes Review of U.S. Pat. No. 9,124,552—IPR2018-01436.
Jul. 20, 2018 (US) Petition for Inter Partes Review of U.S. Pat. No. 9,160,713—IPR2018-01437.
Jul. 26, 2018 (US) Declaration of Kevin Jeffay, PhD in Support of First Petition for Inter Partes Review of U.S. Pat. No. 9,137,205—IPR2018-01443.
Jul. 26, 2018 (US) Declaration of Kevin Jeffay, PhD in Support of Second Petition for Inter Partes Review of U.S. Pat. No. 9,137,205—IPR2018-01444.
Jul. 27, 2018 (US) First Petition for Inter Partes Review of U.S. Pat. No. 9,137,205—IPR2018-01443.
Jul. 27, 2018 U.S. Non-Final Office Action—U.S. Appl. No. 15/382,806.
Jul. 27, 2018 (US) Second Petition for Inter Partes Review of U.S. Pat. No. 9,137,205—IPR2018-01444.
Apr. 2, 2019 (US) Decision—Institution of Inter Partes Review of U.S. Pat. No. 9,560,077—IPR 2018-01513.
Aug. 10, 2018 (US) Petition for Inter Partes Review of Claims 1-20 of U.S. Pat. No. 9,560,077—IPR2018-01513.
Jun. 3, 2019 U.S. Final Office Action—U.S. Appl. No. 15/614,956.
May 23, 2019 U.S. Non-Final Office Action—U.S. Appl. No. 14/745,207.
May 24, 2019 U.S. Non-Final Office Action—U.S. Appl. No. 16/111,524.
Jun. 3, 2019 (EP) Communication pursuant to Article 94(3) EPC—Third Examination Report—App. 13765547.8.
Aug. 2, 2018 U.S. Notice of Allowance and Fees Due—U.S. Appl. No. 16/030,254.
Jul. 5, 2019 (EP) Extended European Search Report—App. 19179539.2.
Aug. 2, 2019 (CA) Office Action—App. 2,888,935.
Aug. 2, 2019 U.S. Non-Final Office Action—U.S. Appl. No. 16/448,969.
Aug. 16, 2019 (EP) Extended Search Report—App. 19170936.9.
Sep. 18, 2018 (US) Petition for Inter Partes Review of U.S. Pat. No. 9,413,722—IPR 2018-01760.
Sep. 18, 2018 (US) Declaration of Dr. Stuart Staniford in Support of Petition for Inter Partes Review of U.S. Pat. No. 9,413,722—IPR 2018-01760.
Sep. 3, 2019 U.S. Notice of Allowance and Fees Due—U.S. Appl. No. 16/518,190.
Aug. 19, 2019 (EP) Communication pursuant to Article 94(3) EPC—Examination Report—App. 14719415.3.
Oct. 11, 2019—U.S. Non-Final Office Action—U.S. Appl. No. 16/554,293.
Oct. 10, 2019—U.S. Notice of Allowance—U.S. Appl. No. 16/448,997.
Sep. 30, 2019 (WO) International Search Report and Written Opinion of International Searching Authority—Application No. PCT/US2019/040830.
Exhibit 1022—"Transmission Control Protocol," IETF RFC 793. J. Postel, ed., Sep. 1981.
Exhibit 1023—"Internet Protocol," IETF RFC 791, J. Postel, ed., Sep. 1981.

(56) References Cited

OTHER PUBLICATIONS

Exhibit 1024—"File Transfer Protocol," IETF RFC 765, J. Postel, ed., Jun. 1980.
May 20, 2019 (US) Decision—Institution of Inter Partes Review of U.S. Pat. No. 9,413,722 B1—IPR 2018-01760.
Aug. 20, 2019 (US) Declaration of Dr. Alessandro Orso in Support of Patent Owner's Response of U.S. Pat. No. 9,413,722—IPR 2018-01760.
Feb. 21, 2019 (US) Patent Owner's Preliminary Response of U.S. Pat. No. 9,413,722—IPR 2018-01760.
Aug. 20, 2019 (US) Patent Owner's Response of U.S. Pat. No. 9,413,722—IPR 2018-01760.
Jan. 15, 2020 (US) Patent Owner's Sur-Reply to Petitioner's Reply—IPR 2018-01760.
Jan. 8, 2020 (US) Deposition of Jacob H. Baugher, III—IPR 2018-01760.
Jan. 23, 2020 U.S. Final Written Decision Determining All Challenged Claims Unpatentable of U.S. Pat. No. 9,160,713 B2—IPR2018-01437.
Jan. 23, 2020 U.S. Final Written Decision Determining All Challenged Claims Unpatentable of U.S. Pat. No. 9,124,552 B2—IPR2018-01436.
Nov. 23, 2020 (EP)—Communication with Extended European Search Report—App 20195362.7.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Sourcefire 3D System User Guide, Version 4.10, Mar. 16, 2011, 2123 pages.
Statement RE: Related Application, dated Jul. 24, 2015.
Tarsa et al., "Balancing Trie-Based Policy representations for Network Firewalls," Department of Computer Science, Wake Forest University, pp. 1-6 (2006).
U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al, "The Secure Shell (SSH) Transport Layer Protocol," SSH Communication Security Corp, Newtork Working Group RFC 4253, Jan. 2006, 32 pages.
Sep. 27, 2018 U.S. Non-Final Office Action—U.S. Appl. No. 15/614,956.
Oct. 4, 2018 U.S. Non-Final Office Action—U.S. Appl. No. 16/030,374.
Oct. 4, 2018 U.S. Notice of Allowance—U.S. Appl. No. 15/827,477.
Aug. 20, 2018 (US) Petition for Inter Partes Review of U.S. Pat. No. 9,565,213—IPR2018-01512.
Aug. 15, 2018 (US) Declaration of Kevin Jeffay, PhD in Support of Petition for Inter Partes Review of U.S. Pat. No. 9,565,213—IPR2018-01512.
"Cisco ACNS Softward Configuration Guide for Centrally Managed Deployments," Release 5.5. Text Part No. OL-9136-01, Cisco Systems, Inc., 2006, 944 pages.
Blake, et al., "An Architecture for Differentiated Services," also known as the Diffserv architecture, as defined in RFC 2475, Network Working Group, Dec. 1998, 36 pages.
Sep. 27, 2018 (WO) International Search Report and Written Opinion—App. PCT/US2018/043367.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Oct. 12, 2018 U.S. Non-Final Office Action—U.S. Appl. No. 16/039,896.
Aug. 29, 2018 (CA) Office Action—App. 2,888,935.
Nov. 14, 2018 U.S. Final Office Action—U.S. Appl. No. 14/745,207.
Dec. 18, 2018 U.S. Final Office Action—U.S. Appl. No. 15/610,995.
Jan. 24, 2019 U.S. Notice of Allowance—U.S. Appl. No. 15/610,995.
Feb. 6, 2019 U.S. Final Office Action—U.S. Appl. No. 15/413,750.
Feb. 6, 2019 U.S. Notice of Allowance and Fees Due—U.S. Appl. No. 16/039,896.
Sep. 17, 2018 (US) Petition for Inter Partes Review of U.S. Pat. No. 9,560,176 (First)—IPR 2018-01654.
Sep. 17, 2018 (US) Declaration of Narasimha Reddy Ph.D., in Support of Petition for Inter Partes Review of U.S. Pat. No. 9,560,176 (First)—IRP2018-01654.
Sep. 17, 2018 (US) Petition for Inter Partes review of U.S. Pat. No. 9,560,176 (Second)—IPR2018-01655.
Sep. 17, 2018 (US) Declaration of Narasimha Reddy Ph.D., in Support of Petition for Inter Partes Review of U.S. Pat. No. 9,560,176 (Second)—IRP2018-01655.
Reddy, A.L.(2012) A.L. Narasimha Reddy Curriculum Vitae. Retrieved from https://cesg.tamu.edu/wp-content/uploads/2012/02/res_ext032.pdf, 16 pages.
Frahim, et al., "Cisco ASA: All-in-One Firewall, IPS, and VPN Adaptive Security Appliance," Indiana: Cisco Press: 2006, 54 pages.
Mar. 8, 2019 U.S. Notice of Allowance and Fees Due—U.S. Appl. No. 16/060,374.
Mar. 11, 2019 (US) Final Office Action—U.S. Appl. No. 16/030,354.
Feb. 21, 2019 U.S. Final Office Action—U.S. Appl. No. 15/382,806.
Jan. 24, 2019 (US) Decision—Institution of Inter Partes Review of U.S. Pat. No. 9,160,713 B2—IPR 2018-01437.
Mar. 8, 2019 U.S. Notice of Allowance and Fees Due—U.S. Appl. No. 16/030,374.
Aug. 21, 2018 (US) Petition for Inter Partes Review of U.S. Pat. No. 9,686,193—IPR2018-01559.
Aug. 15, 2018 (US) Declaration of Staurt Staniford, PhD in Support of Petition for Inter Partes Review of U.S. Pat. No. 9,686,193—IPR2018-01556.
Jan. 24, 2019 (US) Decision—Institution of Inter Partes Review of U.S. Pat. No. 9,124,552 B2—IPR 2018-01436.
Mar. 18, 2019 (AU) First Examination Report—App. 2016379156.
Apr. 8, 2019 U.S. Final Office Action—U.S. Appl. No. 15/413,947.
Aug. 10, 2018 (US) Declaration of Kevin Jeffay, PhD in Support of Fourth Petition for Inter Partes Review of U.S. Pat. No. 9,137,205—IPR2018-01506.
Aug. 10, 2018 (US) Fourth Petition for Inter Partes Review of U.S. Pat. No. 9,137,205—IPR2018-01506.
Aug. 3, 2018 (US) Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,560,077—IPR2018-01513.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—U.S. Office Action—U.S. Appl. No. 11/390,976.

(56) References Cited

OTHER PUBLICATIONS

Sep. 14, 2009 U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015 U.S. Notice of Allowance—U.S. Appl. No. 14/702,755.
Apr. 15, 2016—U.S. Notice of Allowance—U.S. Appl. No. 14/855,374.
Apr. 26, 2016—U.S. Office Action—U.S. Appl. No. 14/745,207.
Jul. 6, 2021, Exhibit 1055, Declaration of Jonathan Bradford, Case IPR2021-01156, U.S. Pat. No. 10,735,380.
Jul. 6, 2021, Exhibit 1056, EDVA Amended Complaint.
Jul. 13, 2021, Petitioner's Power of Attorney, Case No. IPR2021-01270, U.S. Pat. No. 10,735,380.
Jul. 19, 2021, Petition for Inter Partes Review, IPR2021-01270, U.S. Pat. No. 10,735,380.
Jul. 6, 2021, Exhiibit 1002, File History of U.S. Pat. No. 10,735,380.
Jul. 19, 2021, Exhibit 1003, Declaration of Dr. Robert AKL, D. Sc., Case IPR2021-01270, U.S. Pat. No. 10,735,380.
Jul. 19, 2021, Exhibit 1010, SSL Inspection Sourcefire Cybersecurity.
Jul. 19, 2021, Exhibit 1054—Excerpts from XMPP The Definitive Guide.
Jul. 19, 2021, Exhibit 1055, Declaration of Jonathan Bradford, Case IPR2021-01270, U.S. Pat. No. 10,735,380.
Jul. 19, 2021, Exhibit 1056, Amended Complaint, IPR2021-01270.
Jul. 1, 2021, Petitioners Power of Attorney, Palo Alto Networks, Inc.
Jul. 6, 2021, Petition for Inter Partes Review, IPR2021-01155, *Palo Alto Networks, Inc. v. Centripetal Networks, Inc.*, U.S. Pat. No. 10,567,343.
Jul. 6, 2021, Exhibit 1002, File History of U.S. Pat. No. 10,567,343.
Jul. 6, 2021, Exhibit 1003, Declaration of Dr. Robert Akl, D. Sc.
Jul. 6, 2021, Exhibit 1004, Sourcefire 3D System User Guide Version 410.
Jul. 6, 2021, Exhibit 1015, The Transport Layer Security (TLS) Protocol Version 1.1.
Jul. 6, 2021, Exhibit 1005, Declaration of John Leone, *Cisco Systems, Inc. v. Centripetal Networks*.
Jul. 6, 2021, Exhibit 1018, A Shostack, An Overview of SSL Version 2.
Jul. 6, 2021, Exhibit 1021, Internet Protocol, Darpa Internet Program.
Jul. 6, 2021, Exhibit 1011, Sourcefire SSL Appliances Data Sheet.
Jul. 6, 2021, Exhibit 1024, With Microscope and Tweezers: The Worm from MIT's Perspective, An Analysis of the Internet Virus of Nov. 1988.
Jul. 6, 2021, Exhibit 1014, A Challenging but Feasible Blockwise Adaptive Chosen Plaintext Attack on SSL.
Jul. 6, 2021, Exhibit 1027, A Network Security Monitor.
Jul. 6, 2021, Exhibit 1013, Cryptology ePrint Archive.
Jul. 6 2021, Exhibit 1016, Prohibiting Secure Sockets Layer SSL Version 20.
Jul. 6, 2021, Exhibit 1020, A Brief History of the Internet.
Jul. 6, 2021, Exhibit 1030, IRC, ICQ, AIM and More, A History of Instant Messaging.
Jul. 6, 2021, Exhibit 1033, Sourcefire Support Website Webpage.
Jul. 6, 2021, Exhibit 1022, Transmission Control Protocol.
Jul. 6, 2021, Exhibit 1023, The Internet Worm Program An Analysis.
Jul. 6, 2021, Exhibit 1036, The Original HTTP as Defined in 1991.
Jul. 6, 2021, Exhibit 1026, Simple and Flexible Datagram Access Controls for Unix based Gateways.
Jul. 6, 2021, Exhibit 1039, The First Few Milliseconds of an HTTPS Connection.
Jul. 6, 2021, Exhibit 1025, The Cornell Commission on Morris and the Worm.
Jul. 6, 2021, Exhibit 1042, IPR2018 01436 Final Written Decision.
Jul. 6, 2021, Exhibit 1029, Snort Lightweight Intrusion Detection for Networks.
Jul. 6, 2021, Exhibit 1032, A History and Survey of Network Firewalls.
Jul. 6, 2021, Exhibit 1045, IPR2018 01559 Institution Decision.
Jul. 6, 2021, Exhibit 1028, NetRanger Network Security Management System User Guide.
Jul. 6, 2021, Exhibit 1031, Classical vs Transparent IP Proxies.
Jul. 6, 2021, Exhibit 1038, HTTP overTLS.
Jul. 6, 2021, Exhibit 1048, Jun. 30, 2021 E-mail from Counsel for Centripetal Networks, Inc.
Jul. 6, 2021, Exhibit 1041, IPR2018 01436 Institution Decision.
Jul. 6, 2021, Exhibit 1044, Chart Comparing the Challenged Claims to the Claims of U.S. Pat. No. 9,124,552.
Jul. 6, 2021, Exhibit 1037, SSLTLS and PKI History.
Jul. 6, 2021, Exhibit 1047, Jul. 1, 2021 letter to the U.S. District Court for the Eastern District of Virginia.
Jul. 6, 2021, Exhibit 1046, Jun. 28, 2021 E-mail from the U.S. District Court for the Eastern District of Virginia to Counsel.
Jul. 6, 2021, Exhibit 1049, Declaration of Jonathan Bradford.
Jul. 6, 2021, Exhibit 1010, SSL Appliances Webpage.
Jul. 6, 2021, Exhibit 1017, NDM Webpage.
Jul. 6, 2021, Exhibit 1043, *Centripetal Networks, Inc. v. Cisco Sys., Inc.*, 847 F. Appx 869.

(56) References Cited

OTHER PUBLICATIONS

Jul. 1, 2021, Petitioner's Power of Attorney, *Palo Alto Networks, Inc.* v. *Centripetal Networks, Inc.*, Case No. IPR2021-01156.
Jul. 6, 2021, Petition for Inter Partes Review, IPR2021-01156, U.S. Pat. No. 10,735,380.
Jul. 6, 2021, Exhibit 1003, Declaration of Dr. Robert AKL, D.Sc., Case IPR2021-01156.
Jul. 6, 2021, Exhibit 1005, Declaration of John Leone, *Cisco Systems, Inc.* v. *Centripetal Networks, Inc.*, U.S. Pat. No. 9,124,552.
Jul. 6, 2021, Exhibit 1034, Sourcefire Expands IPS Solutions Portfolio.
Jul. 6, 2021, Exhibit 1035, RFC 765 File Transfer Protocol.
Jul. 6, 2021, Exhibit 1047, Jul. 14, 2021 e-mail to the U.S. District Court for the Eastern District of Virginia.
Jul. 6, 2021, Exhibit 1050, Final Written Decision, IPR2018-01760, U.S. Pat. No. 9,413,722.
Jul. 6, 2021, Exhibit 1051, Petition for Inter Partes Reivew of U.S. Pat. No. 9,413,722, *Cisco Systems Inc.* v. *Centripetal Networks Inc.*
Oct. 25, 2021, Patent Owners Preliminary Response, IP2021-01155 (U.S. Pat. No. 10,567,343), *Palo Alto Networks, Inc.* v. *Centripetal Network, Inc.*
Oct. 28, 2021, Patent Owners Preliminary Response, IP2021-01270 (U.S. Pat. No. 10,735,380), *Palo Alto Networks, Inc.* v. *Centripetal Network, Inc.*
Dec. 28, 2021, Patent Owners Preliminary Response, IP2021-01520 (U.S. Pat. No. 9,686,193), *Palo Alto Networks, Inc.* v. *Centripetal Network, Inc.*
Oct. 28, 2021, Patent Owners Preliminary Response, IP2021-01156 (U.S. Pat. No. 10,735,380), *Palo Alto Networks, Inc.* v. *Centripetal Network, Inc.*
Jan. 20, 2021, Decision Denying Institution of Inter Partes Review, IP2021-01155 (U.S. Pat. No. 10,567,343), *Palo Alto Networks, Inc.* v. *Centripetal Network, Inc.*
Jan. 24, 2021, Decision Denying Institution of Inter Partes Review, IP2021-01270 (U.S. Pat. No. 10,735,380), *Palo Alto Networks, Inc.* v. *Centripetal Network, Inc.*
Jan. 24, 2021, Decision Denying Institution of Inter Partes Review, IP2021-01156 (U.S. Pat. No. 10,735,380), *Palo Alto Networks, Inc.* v. *Centripetal Network, Inc.*
Dec. 13, 2021, (EP) Summons to Attend Oral Proceedings, 14719415.3-1213/2974212.
Jun. 23, 2021—(EP) Notice of Opposition—Patent No. 2974212 [App. No. 14719415.3].
Deering & Hinden, "Internet Protocol, Version 6 (IPv6)," The Internet Society, RFC 2460 (Dec. 1998).
Dierks & Allen, "The TLS Protocol, Version 1.0" The Internet Society, RFC (Jan. 1999).
Dierks & Rescorta, "The Transport Layer Security (TLS) Protocol Version 1.2," The IETF Trust, RFC 5246 (Aug. 2008).
Fielding et al., "Hypertext Transfer Protocol—HTTP/1.1," The Internet Society, RFC 2616 (Jun. 1999).
Eric Cole et al., Network Security Bible, pp. 237-254 (2005).
Richard A. Deal, "Cisco Router Firewall Security," pp. 5-51, 259-260, 301-317, 351-361, 444-450, 597-603, 631 (2004).
Sourcefire 3D System User Guide Version 5.1.1 (2012).
Declaration of Sarah Ehrig on "Sourcefire 3D System User Guide Version 4.10" (Jun. 14, 2021).
Declaration of Jacob H. Baugher III filed in IPR2018-01760 *Cisco Systems, Inc.* v. *Centripetal Networks, Inc.* (Dec. 4, 2019).
Declaration of Ehrig on "Sourcefire 3D System User Guide Version 5.1.1" (Jun. 21, 2021).
May 5, 2021, (US) Re-Exam of U.S. Pat. No. 9,686,193.
"Sourcefire SSL Appliance Administration & Deployment Guide for SSL1500, SSL200, and SSL8200, Software Version 3.6," published in 2014, submitted as —Exhibit D6-.
Nov. 23, 2021—(EP) Notice of Intervention, Opposition Against EP3395043, 29 pages.
Mar. 22, 2022, IPR2021-01520, U.S. Pat. No. 9,686,193B2, *Palo Alto Networks, Inc.* v. *Centripetal Networks, Inc.*, Decision Denying Institution of Inter Partes Review.

\* cited by examiner

| Rule # | IP Protocol | Source IP Address | Source Port | Destination IP Address | Destination Port | Operator |
|---|---|---|---|---|---|---|
| 1 (302) | TCP | 140.210.* | * | 140.212.* | 22 | ALLOW |
| 2 (304) | TCP | 140.210.* | * | 140.212.* | 25 | ALLOW |
| 3 (306) | TCP | 140.210.* | * | 140.212.* | 110 | ALLOW |
| 4 (308) | TCP | 140.210.* | * | 140.212.* | 143 | ALLOW |
| 5 (310) | TCP | 140.210.* | * | 140.212.* | 443 | REQUIRE-TLS-1.1-1.2 |
| 6 (312) | TCP | 140.210.* | * | 214.* | 80 | HTTP-EXFIL |
| 7 (314) | * | * | * | * | * | BLOCK |

Columns 2–6 form the Five-tuple.

FIG. 3

FILTERING NETWORK DATA TRANSFERS

CROSS-REFERENCE TO RELATED APPLICATION

This application is a continuation of and claims priority to U.S. patent application Ser. No. 16/945,981, filed on Aug. 3, 2020, and entitled "FILTERING NETWORK DATA TRANSFERS," which is a continuation of U.S. patent application Ser. No. 16/791,044, filed on Feb. 14, 2020, now U.S. Pat. No. 10,735,380, and entitled "FILTERING NETWORK DATA TRANSFERS," which is a continuation of U.S. patent application Ser. No. 15/614,956, filed on Jun. 6, 2017, now U.S. Pat. No. 10,567,343, and entitled "FILTERING NETWORK DATA TRANSFERS," which is a continuation of U.S. patent application Ser. No. 14/625,486, filed on Feb. 18, 2015, now U.S. Pat. No. 9,686,193, and entitled "FILTERING NETWORK DATA TRANSFERS," which is a continuation of U.S. patent application Ser. No. 13/795,822, filed on Mar. 12, 2013, now U.S. Pat. No. 9,124,552, and entitled "FILTERING NETWORK DATA TRANSFERS." The disclosures of these two priority applications are incorporated by reference herein in their entirety and made part hereof.

BACKGROUND

The TCP/IP network protocols (e.g., the Transmission Control Protocol (TCP) and the Internet Protocol (IP)) were designed to build large, resilient, reliable, and robust networks. Such protocols, however, were not originally designed with security in mind. Subsequent developments have extended such protocols to provide for secure communication between peers (e.g., Internet Protocol Security (IPsec)), but the networks themselves remain vulnerable to attack (e.g., Distributed Denial-of-Service (DDoS) attacks, phishing attacks, and the like).

A category of cyber attack known as exfiltrations (e.g., stealing sensitive data or credentials via the Internet) has proven to be especially difficult for conventional cyber defense systems to prevent. A first cause is that many exfiltrations are facilitated by using popular network data transfer protocols, such as the Hypertext Transfer Protocol (HTTP) used by the World Wide Web, that often appear to an observer (e.g., a conventional cyber defense system) as normal network behavior. A second cause is that typical network trust models, such as those used by network firewalls, interpret exfiltrations as trusted operations. A third cause is that human users often knowingly or unknowingly engage in network activities that are vulnerable to attack. A fourth cause is the general inability of conventional cyber defense systems to scale sufficiently to counter a cyber threat; for example, with respect to traffic volumes, network link speeds, network performance (e.g., latency and packet loss requirements), network usage policy enforcement, etc. Accordingly, many cyber attacks (e.g., DDoS attacks and exfiltrations) leverage Internet-scale characteristics to achieve their goals. Moreover, beyond those enumerated here, there are other causes for the failure of conventional, state-of-the-art cyber defense systems to prevent cyber attacks, such as exfiltrations.

SUMMARY

The following presents a simplified summary in order to provide a basic understanding of some aspects of the disclosure. It is neither intended to identify key or critical elements of the disclosure nor to delineate the scope of the disclosure. The following summary merely presents some concepts in a simplified form as a prelude to the detailed description below.

Aspects of this disclosure relate to filtering network data transfers. In some variations, multiple packets may be received. A determination may be made that a portion of the packets have packet header field values corresponding to a packet filtering rule. Responsive to such a determination, an operator specified by the packet filtering rule may be applied to the portion of packets having the packet header field values corresponding to the packet filtering rule. A further determination may be made that one or more of the portion of the packets have one or more application header field values corresponding to one or more application header field criteria specified by the operator. Responsive to such a determination, at least one packet transformation function specified by the operator may be applied to the one or more of the portion of the packets.

In some embodiments, a network packet filter may be located at a boundary between a secured network and an unsecured network (e.g., the Internet). The filter may observe packets traversing the network link between the secured network and the unsecured network. The filter may be capable of comparing certain packet header information (e.g., source and destination IP address(es), source and destination port(s), and protocol type(s)) with one or more packet filtering rules, which may define a network usage policy or network security policy. One or more of the rules may be associated with an operator that may be applied to a packet that matches one or more criteria specified by the rule.

Such packet filters may implement at least two operators: an identity operator, which may allow the packet to continue towards its destination, and a null operator which may prevent, or block, the packet from continuing towards its destination. In some embodiments, the network packet filter may implement one or more additional operators having the capability to determine if a packet contains an application-level header that specifies a particular method associated with a data transfer protocol; and, if so, whether to apply an identity operator or null operator to the packet. To distinguish a network packet filter that implements said additional operators from network packet filters that do not, a network packet filter that implements such additional operators will be referred to hereinafter as a packet security gateway (PSG).

For example, such an operator may be able to perform one or more of the following functions: (1) determine if an IP packet traversing a boundary contains an HTTP packet (e.g., an application-level HTTP packet) that specifies one or more specific HTTP methods (e.g., GET, PUT, POST, etc.), and (2) allow the packet (e.g., if a GET method is specified), or block the packet (e.g., if a PUT or POST method is specified). One or more administrators of the secured network may associate such an operator with one or more rules in a network security policy in order to enforce, via the PSG, a Web usage policy that may, for example, allow users to surf (e.g., GET) to one or more web sites attached to the Internet, but may prevent such user(s) from one or more of writing (e.g., PUT) data files or posting (e.g., POST) forms to one or more web sites. For example, administrator(s) may utilize such functionality to prevent one or more exfiltrations (e.g., file transfers containing sensitive information, posting of login credentials (usernames and passwords), etc.) to network nodes (e.g., web sites) that they may not trust.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements.

FIG. 3 illustrates an exemplary dynamic security policy with operators that filter on data transfer protocol, or application-layer protocol, header information.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. These connections are general and, unless specified otherwise, may be direct or indirect, wired or wireless, physical or logical. In this respect, the specification is not intended to be limiting.

Figure 1:
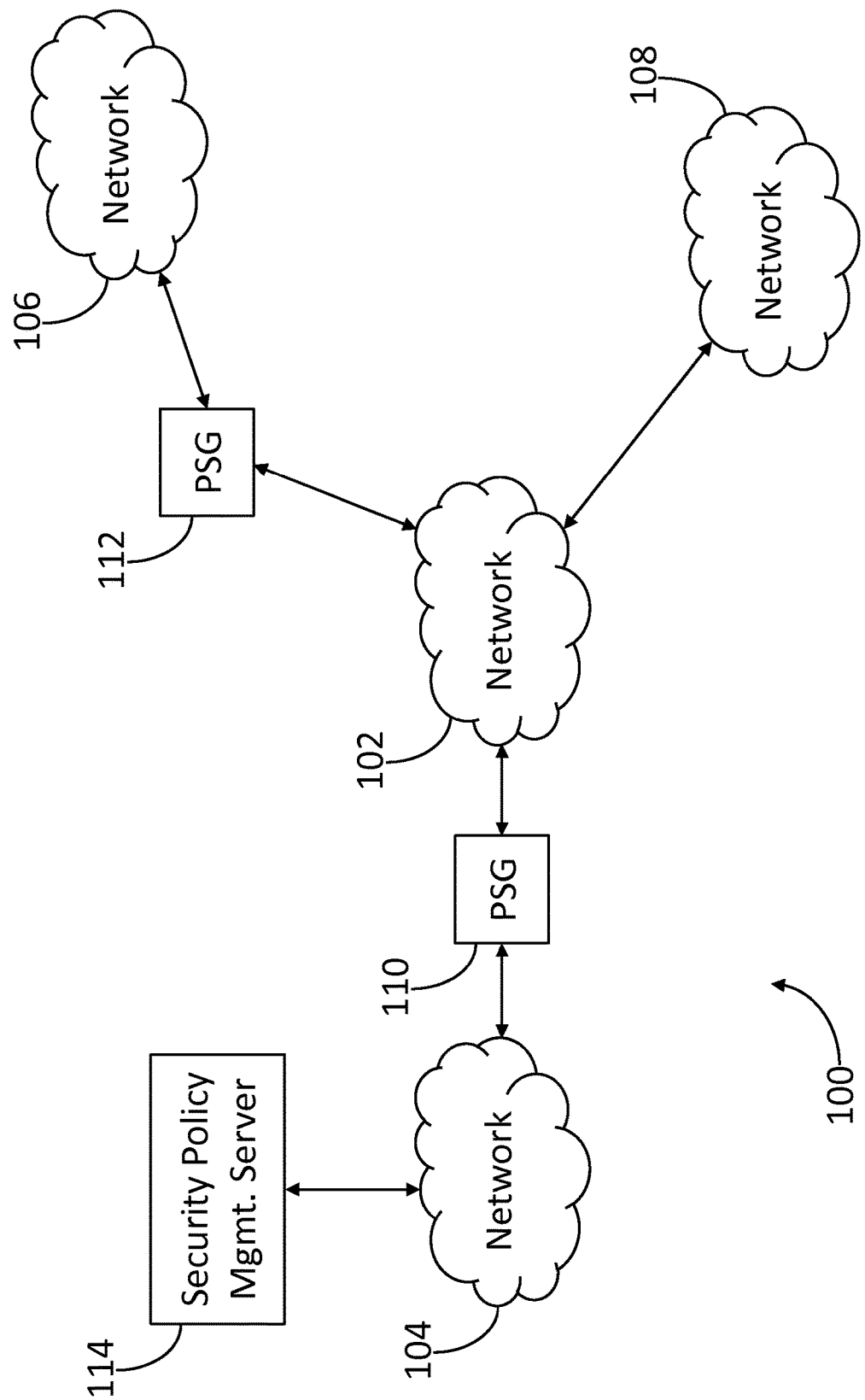
FIG. 1 illustrates an exemplary network environment in which one or more aspects of the disclosure may be implemented.

FIG. 1 illustrates an exemplary network environment 100 in which one or more aspects of the disclosure may be implemented. Referring to FIG. 1, network 102 may function as an interconnect between networks 104, 106, and 108. For example, network 102 may be the public Internet, or some other large TCP/IP network functioning as an interconnect between one or more Local Area Networks (LANs) or Wide-Area Networks (WANs), (e.g., the Non-classified Internet Protocol (IP) Router Network (NIPRNet), operated by the United States Defense Information Systems Agency (DISA)). Networks 104, 106, and 108 may be LANs or WANs operated by or otherwise associated with various organizations (e.g., one or more commercial enterprises, companies, universities, military commands, government agencies, or cyber criminal organizations).

For example, a geographically distributed commercial enterprise X may own and operate networks 104 and 106, and use network 102 (e.g., the Internet) to interconnect networks 104 and 106, and to access other networks (e.g., other networks not owned or operated by enterprise X) attached to network 102. One or more computing devices (e.g., workstations, servers, etc.) of enterprise X may be attached to network 104 or 106. Network 108 may be owned and operated by a cyber criminal organization Z, which may attempt to steal information (e.g., sensitive data) from enterprise X, for example, via network 102. Members of organization Z may attach one or more computing devices (e.g., workstations or servers) to network 108, and may use these workstation(s) or server(s) to attack or collect data from one or more networks affiliated with enterprise X (e.g., network 104 or 106).

As used herein, a packet security gateway (PSG) may include one or more computing devices configured to receive packets, and apply one or more filters or operators, including an identity (e.g., allow) or null (e.g., block) operator, to the packets. In some embodiments, a packet security gateway may be configured to apply one or more additional operators as described herein. As used herein, a security policy management server may include one or more computing devices configured to communicate a dynamic security policy to a packet security gateway. In some embodiments, a security policy management server may be configured to perform one or more additional functions as described herein. As used herein, a dynamic security policy may include one or more rules, messages, instructions, files, data structures, or the like specifying criteria corresponding to one or more packets and may identify one or more operators to be applied to packets corresponding to the specified criteria. In some embodiments, a dynamic security policy may specify one or more additional parameters as described herein.

Network environment 100 may include one or more packet security gateways and one or more security policy management servers. For example, network environment 100 may include packet security gateways 110 and 112, and security policy management server 114. One or more security policy management servers may be associated with a protected network. For example, networks 104 and 106 may each be distinct LANs associated with a common enterprise X, and may each form part of a protected or secured network associated with security policy management server 114. Enterprise X may desire to prevent cyber attacks (e.g., exfiltrations) from one or more of its networks (e.g., network 104 or 106). Accordingly, it may locate one or more packet security gateways at each boundary between its networks and one or more public interconnect networks (e.g., network 102), which may be utilized by a cyber criminal, such as organization Z, to attempt to remotely access its networks (e.g., network 104 or 106), and which may, for example, potentially be used to attempt to transfer data from one or more of its networks (e.g., network 104 or 106) to one or more networks affiliated with organization Z (e.g., network 108). For example, packet security gateway 110 may protect network 104 from one or more cyber attacks (e.g., exfiltrations) mediated by network 102 (e.g., the Internet), and packet security gateway 112 may protect network 106 from one or more cyber attacks (e.g., exfiltrations) mediated by network 102.

As will be described in greater detail below, each of one or more packet security gateways associated with a security policy management server may be configured to receive a dynamic security policy from a security policy management server, receive packets associated with a network protected by the packet security gateway, and perform one or more operations specified by the dynamic security policy on the packets. For example, each of packet security gateways 110 and 112 may be configured to receive a dynamic security policy from security policy management server 114. Each of packet security gateways 110 and 112 may also be configured to receive packets associated with networks 104, 106, or 108. Each of packet security gateways 110 and 112 may further be configured to apply one or more rules or operators specified by the dynamic security policy received from security policy management server 114 to packets associated with networks 104, 106, or 108.

Figure 2:
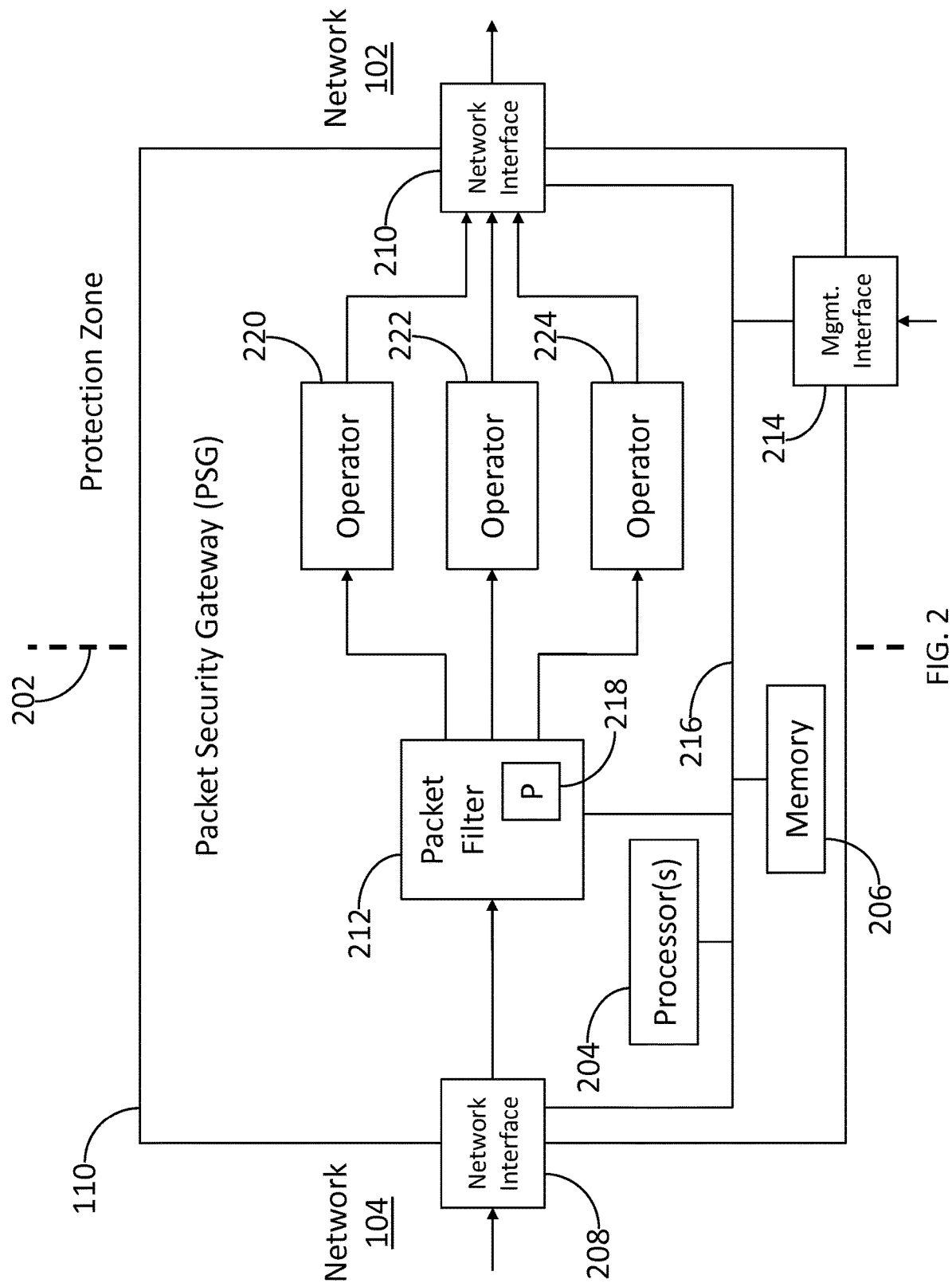
FIG. 2 illustrates an exemplary packet security gateway.

FIG. 2 illustrates an exemplary packet security gateway according to one or more aspects of the disclosure. Referring to FIG. 2, as indicated above, packet security gateway 110 may be located at network boundary 202 between networks 104 and 102. Packet security gateway 110 may include one or more processors 204, memory 206, network interfaces 208 and 210, packet filter 212, and management interface 214. Processor(s) 204, memory 206, network interfaces 208 and 210, packet filter 212, and management interface 214 may be interconnected via data bus 216. Network interface 208 may connect packet security gateway 110 to network 104. Similarly, network interface 210 may connect packet security gateway 110 to network 102. Memory 206 may include one or more program modules that when executed by processor(s) 204, may configure packet security gateway 110 to perform one or more of various functions described herein.

Packet security gateway 110 may be configured to receive a dynamic security policy from security policy management server 114. For example, packet security gateway 110 may receive dynamic security policy 218 from security policy management server 114 via management interface 214 (e.g., via out-of-band signaling) or network interface 208 (e.g., via in-band signaling). Packet security gateway 110 may include one or more packet filters or packet discriminators, or logic for implementing one or more packet filters or packet discriminators. For example, packet security gateway 110 may include packet filter 212, which may be configured to examine information associated with packets received by packet security gateway 110 and forward such packets to one or more of operators 220, 222, or 224 based on the examined information. For example, packet filter 212 may examine information associated with packets received by packet security gateway 110 (e.g., packets received from network 104 via network interface 208) and forward the packets to one or more of operators 220, 222, or 224 based on the examined information.

As will be described in greater detail below, dynamic security policy 218 may include one or more rules and the configuration of packet filter 212 may be based on one or more of the rules included in dynamic security policy 218. For example, dynamic security policy 218 may include one or more rules specifying that packets having specified information should be forwarded to operator 220, that packets having different specified information should be forwarded to operator 222, and that all other packets should be forwarded to operator 224. Operators 220, 222, and 224 may be configured to perform one or more functions on packets they receive from packet filter 212. For example, one or more of operators 220, 222, or 224 may be configured to forward packets received from packet filter 212 into network 102, forward packets received from packet filter 212 to an IPsec stack (not illustrated) having an IPsec security association corresponding to the packets, or drop packets received from packet filter 212. In some embodiments, one or more of operators 220, 222, or 224 may be configured to drop packets by sending the packets to a local "infinite sink" (e.g., the /dev/null device file in a UNIX/LINUX system).

FIG. 3 illustrates an exemplary dynamic security policy in accordance with one or more embodiments. Referring to FIG. 3, dynamic security policy 218 may include rules 1 302, 2 304, 3 306, 4 308, 5 310, 6 312, and 7 314. Each of these rules may specify criteria and one or more operators that may be applied to packets associated with (e.g., matching) the specified criteria. The specified criteria may take the form of a five-tuple, which may, for example, comprise one or more values selected from, packet header information, specifying a protocol type of the data section of an IP packet (e.g., TCP, User Datagram Protocol (UDP), Internet Control Message Protocol (ICMP), or one or more other protocols), one or more source IP addresses, one or more source port values, one or more destination IP addresses, and one or more destination ports.

For example, rule 1 302 may specify that IP packets containing one or more TCP packets, originating from a source IP address that begins with 140.210, having any source port, destined for an IP address that begins with 140.212, and destined for port 22 (e.g., associated with the Secure Shell (SSH) protocol) should have an ALLOW operator (e.g., an identity operator) applied to them. Similarly, rule 2 304 may specify that IP packets containing one or more TCP packets, originating from a source IP address that begins with 140.210, having any source port, destined for an IP address that begins with 140.212, and destined for port 25 (e.g., associated with the Simple Mail Transfer Protocol (SMTP)) should have an ALLOW operator applied to them.

Rule 3 306 may specify that IP packets containing one or more TCP packets, originating from a source IP address that begins with 140.210, having any source port, destined for an IP address that begins with 140.212, and destined for port 110 (e.g., associated with Post Office Protocol version 3 (POP3)) should have an ALLOW operator applied to them.

Rule 4 308 may specify that IP packets containing one or more TCP packets, originating from a source IP address that begins with 140.210, having any source port, destined for an IP address that begins with 140.212, and destined for port 143 (e.g., associated with the Internet Message Access Protocol (IMAP)) should have an ALLOW operator applied to them.

Rule 5 310 may specify that IP packets containing one or more TCP packets, originating from a source IP address that begins with 140.210, having any source port, destined for an IP address that begins with 140.212, and destined for port 443 (e.g., associated with the port for the Hypertext Transfer Protocol Secure (HTTPS) protocol) should have a specified Transport Layer Security (TLS) protocol (e.g., REQUIRE-TLS 1.1-1.2) operator (as described in greater detail below) applied to them.

Rule 7 314 may be a "wildcard" rule and may apply a BLOCK operator (e.g., a null operator which "drops" any packets it is applied to) to any packets that do not match the criteria of any of Rules 1 302, 2 304, 3 306, 4 308, 5 310, or 6 312 (e.g., when rules 1 302, 2 304, 3 306, 4 308, 5 310, 6 312, and 7 314 are applied to packets in a linear fashion).

As described above with respect to FIG. 1, networks 104 and 106 may be owned or operated by enterprise X. Enterprise X may have allocated IPv4 addresses 140.210.0.0/16 to network 104, and IPv4 addresses 140.212.0.0/16 to network 106. Enterprise X may have loaded PSG 110 with dynamic security policy 218, and may utilize PSG 110 to enforce one or more network security policies embodied in one or more rules of dynamic security policy 218 to restrict network communications between networks 104 and 106 (e.g., to secure system logins, e-mail, encrypted web sessions, and the like). For example, based on standard usage of ports, rule 1 302 may allow any hosts attached to network 104 to conduct Secure Shell (SSH) sessions (e.g., system logins) with any hosts attached to network 106; rule 2 304 may allow any e-mail servers attached to network 104 to conduct SMTP sessions (e.g., e-mail transfer sessions) with any e-mail servers attached to network 106; rule 3 306 and rule 4 308, may respectively allow e-mail clients attached to network 104 to conduct POP3 and IMAP sessions (e.g., e-mail download sessions into a webmail browser application) with any e-mail servers attached to network 106; and rule 5 310 may allow web browsers attached to network 104 to conduct HTTPS sessions (e.g., secure web sessions) with any web servers attached to network 106, but may, as described in greater detail below, utilize the REQUIRE-TLS-1.1-1.2 operator to ensure that only HTTPS secure web sessions using version 1.1 or 1.2 of the Transport Layer Security (TLS) protocol to secure such HTTPS sessions are allowed (e.g., because the popular TLS version 1.0 protocol has a known security vulnerability that attackers may exploit to decrypt HTTPS sessions).

Rule 6 312 may specify that IP packets containing one or more TCP packets, originating from a source IP address that begins with 140.210., having any source port, destined for an IP address that begins with 200.214, and destined for port 80 (e.g., associated with the HTTP protocol) should have an HTTP-EXFIL operator applied to them. As described in greater detail below, an HTTP-EXFIL operator may allow HTTP packets containing a GET method, but may block HTTP packets containing other HTTP methods (e.g., PUT, POST, CONNECT, etc.). Such an operator may thus allow a web browser to "surf the web" (e.g., download web pages hosted by web servers), but may prevent the web browser from writing files to a web server (e.g., using the PUT method), posting forms (e.g., forms that might contain login credentials, such as usernames or passwords) to a web server (e.g., using the POST method), or otherwise communicating with a web server (e.g., using any HTTP method except GET). Because attackers may often use HTTP PUT or POST methods to exfiltrate sensitive data, operators such as HTTP-EXFIL may be used to stop such exfiltrations.

Returning to the example described above, organization Z may own or operate network 108, and may have allocated network IP addresses 214.0.0.0/8 to network 108. Enterprise X may not have a business relationship with organization Z, and may therefore not consider network 108 to be trusted. While enterprise X could simply block all communications to networks that are owned or operated by organizations it does not fully trust, this would likely result in enterprise X blocking access to most of the Internet. Enterprise X's employees, therefore, could not freely surf the Web, which may restrict the employees' ability to conduct business on behalf of enterprise X. By enforcing sets of rules similar to rule 6 312 that may apply operators like or similar to HTTP-EXFIL, enterprise X may enable its employees to freely surf the web and conduct company business, but may prevent one or more cyber attacks (e.g., HTTP-mediated exfiltrations).

One function of operators like HTTP-EXFIL and REQUIRE-TLS-1.1-1.2 may be to inspect fields in the headers of application packets contained in IP packets, determine field values, and depending on the field values, decide to allow, block, or otherwise apply a packet transformation function (e.g., encapsulate the packet into a tunnel, alter one or more header field values, etc.) to the packets. The logic for this function may be executed by one or more of operators 220, 222, or 224. The logic may be developed in a high-level programming language such as C. An example of such programmatic logic, written in pseudocode, for the HTTP-EXFIL operator, is as follows:

```
Operator HTTP-EXFIL(ip-packet):
  Inspect app-pkt(ip-packet) match GET return ALLOW;
  Inspect app-pkt(ip-packet) match POST return BLOCK;
  Inspect app-pkt(ip-packet) match PUT return BLOCK;
  Inspect app-pkt(ip-packet) match DELETE return BLOCK;
  Inspect app-pkt(ip-packet) match CONNECT return BLOCK;
  Return BLOCK;
End Operator HTTP-EXFIL;
```

Referring to the above-example, Operator HTTP-EXFIL may accept as input an IP packet that matches a rule, such as rule 6 312 of dynamic security policy 218. If the application packet contained in the IP packet is an HTTP packet, the value of the HTTP method field in the HTTP packet header may be compared to the values that encode the GET, POST, PUT, DELETE, and CONNECT methods. If a match is found, then the HTTP-EXFIL operator may return either ALLOW or BLOCK, depending on the method value. If no match is found, then the HTTP-EXFIL operator may return BLOCK.

An example of programmatic logic, written in pseudocode, for a REQUIRE-TLS-1.1-1.2 operator is provided below. The REQUIRE-TLS-1.1-1.2 operator may be associated with filter rules for HTTPS sessions, such as rule 5 310 of dynamic security policy 218. HTTPS may be used to encrypt HTTP sessions. HTTPS is not a protocol per se, but rather the result of layering the HTTP protocol on top of the TLS protocol. For an HTTPS session composed of IP packets, the application packets contained in the IP packets may be TLS Record Protocol packets. The header fields of TLS Record Protocol packets may not be encrypted. One of the header fields may contain a value indicating the TLS version.

Exemplary programmatic logic for a REQUIRE-TLS-1.1-1.2 operator, written in pseudocode, is as follows:

```
Operator REQUIRE-TLS-1.1-1.2(ip-packet):
  Inspect app-pkt(ip-packet) match 1.0 return BLOCK;
  Inspect app-pkt(ip-packet) match 1.1 return ALLOW;
  Inspect app-pkt(ip-packet) match 1.2 return ALLOW;
  Return BLOCK;
End Operator REQUIRE-TLS-1.1-1.2;
```

Referring to the above-example, Operator REQUIRE-TLS-1.1-1.2 may accept as input an IP packet that matches a rule, such as rule 5 310 of dynamic security policy 218. If the application packet contained in the IP packet is a TLS Record Protocol packet, the value of the version field in the TLS Record Protocol packet header may be compared to the values that encode version numbers 1.0, 1.1, and 1.2. If a match is found, then the REQUIRE-TLS-1.1-1.2 operator may return either ALLOW or BLOCK, depending on the version number value. If no match is found, then the REQUIRE-TLS-1.1-1.2 operator may return BLOCK.

The filtering process described herein may be viewed as having two (2) stages: A first stage in which the "5-tuple" of IP packet header field values and transport protocol (e.g., TCP, UDP, etc.) packet header field values may be filtered; and, a second stage in which application packet header field values may be filtered (e.g., by applying operator logic similar to that described above). Conceptually, the first stage may determine if the network policy allows any communications between the resources identified in the 5-tuple rule; if so, the second stage may determine if the policy allows the specific method or type of communication (e.g., file read, file write, encrypted communication, etc.) between the resources. Such a method may, however, be used in other conceptual models.

The methods described above may be modified to achieve different functionality and may be extended to other data transfer protocols or to other application-layer protocols. These methods may provide network administrators with capabilities to enforce network usage policies and network security policies that have capabilities and functionalities beyond those described above. For example, these methods may provide network administrators with capabilities to prevent exfiltrations that are mediated by other data transfer protocols besides HTTP and HTTPS. Examples of such protocols include File Transfer Protocol (FTP) and messaging protocols such as eXtensible Messaging and Presence Protocol (XMPP). Moreover, new network applications may emerge in the future which may use new data transfer protocols or application-layer protocols to which the present methods may be applied. These methods may also be used for purposes other than network policy enforcement and exfiltration prevention. For example, it may be useful for a packet filter to rapidly detect if an IP packet contains a Real-time Transport Protocol (RTP) application packet used to deliver audio or video information (e.g., if a cyber attack based on RTP has yet to be discovered, network administrators may choose to not process RTP packets through the cyber security defense systems that may be protecting their networks).

Figure 4:
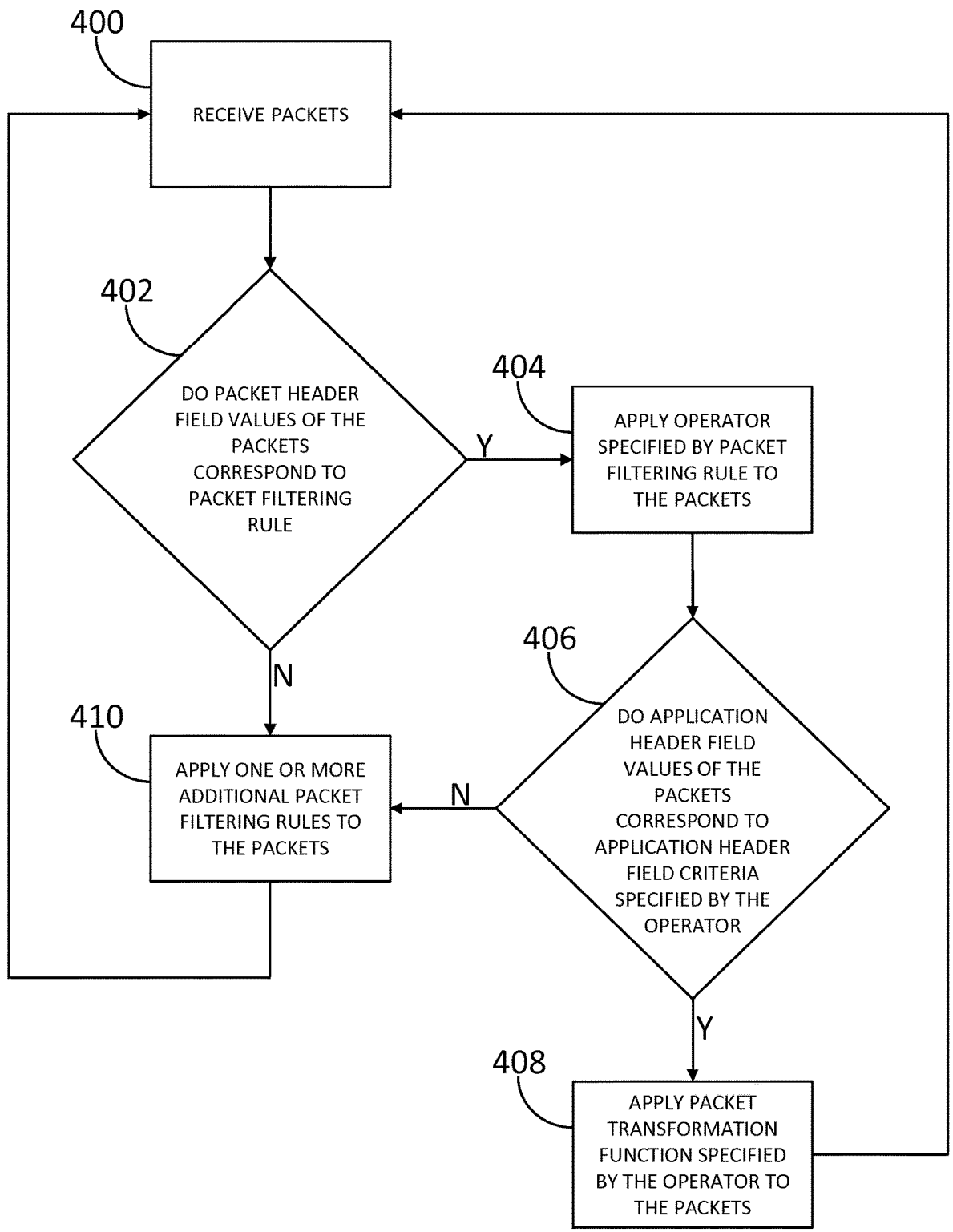
FIG. 4 illustrates an exemplary method for protecting a secured network by enforcing one or more network usage policies or network security policies.

FIG. 4 illustrates an exemplary method for protecting a secured network in accordance with one or more embodiments of the present disclosure. The steps may be performed at one or more packet security gateways associated with a security policy management server. For example, each of packet security gateways 110 and 112 may be associated with security policy management server 114, and the steps may be performed at packet security gateway 110 or 112. At step 400, packets may be received. For example, packet security gateway 110 may receive packets from network 104 via network interface 208 that are destined for network 106. At step 402, a determination may be made as to whether a portion of the received packets have packet header field values corresponding to a packet filtering rule. For example, a determination may be made as to whether a portion of the packets received from network 104 have packet header field values (e.g., one or more of one or more data section protocols, one or more source IP addresses, one or more source ports, one or more destination IP addresses, or one or more destination ports) corresponding to rule 5 310. At step 404, responsive to determining that one or more of the portion of received packets have packet header field values corresponding to the packet filtering rule, an operator specified by the packet filtering rule may be applied to the portion of the received packets. For example, the REQUIRE TLS-1.1-1.2 operator specified by rule 5 310 may be applied to the portion of the received packets.

At step 406, a determination may be made as to whether one or more application header field values of one or more of the portion of the received packets correspond to one or more application header field criteria specified by the operator. For example, a determination may be made as to whether one or more of the portion of the received packets have application header field values corresponding to one or more application header field criteria of the REQUIRE TLS-1.1-1.2 operator specified by rule 5 310 (e.g., application header field values corresponding to TLS version 1.1 or 1.2). At step 408, responsive to determining that one or more of the portion of received packets have application header field values corresponding to one or more application header field criteria specified by the operator, a packet transformation function specified by the operator may be applied to the one or more of the portion of the received packets. For example, an ALLOW packet transformation function specified by the REQUIRE TLS-1.1-1.2 operator may be applied to the one or more of the portion of the received packets having application header field values corresponding to one or more application header field criteria of the REQUIRE TLS-1.1-1.2 operator specified by rule 5 310 (e.g., each of the one or more of the portion of the received packets may be allowed to continue toward their respective destinations). The method may then return to step 400 and await receipt of one or more additional packets (e.g., one or more additional packets from network 104 received via network interface 208 that are destined for network 106).

Returning to step 406, a determination may be made as to whether one or more application header field values of one or more of the portion of the received packets correspond to one or more application header field criteria specified by the operator. For example, a determination may be made as to whether one or more of the portion of the received packets have application header field values corresponding to one or more application header field criteria of the REQUIRE TLS-1.1-1.2 operator specified by rule 5 310 (e.g., application header field values corresponding to TLS version 1.1 or 1.2). Responsive to determining that one or more of the portion of received packets have application header field values that do not correspond to one or more application header field criteria specified by the operator, one or more additional packet filtering rules may be applied to the one or more of the portion of the received packets. For example, rule 7 314 may be applied to the one or more of the portion of the received packets having application header field values that do not correspond to one or more application header field criteria of the REQUIRE TLS-1.1-1.2 operator specified by rule 5 310 (e.g., each of the one or more of the portion of the received packets may be blocked from continuing toward their respective destinations). The method may then return to step 400 and await receipt of one or more additional packets (e.g., one or more additional packets from network 104 received via network interface 208 that are destined for network 106).

Returning to step 402, a determination may be made as to whether a portion of the received packets have packet header field values corresponding to a packet-filtering rule. For example, a determination may be made as to whether a portion of the packets received from network 104 have packet header field values (e.g., one or more of one or more data section protocols, one or more source IP addresses, one or more source ports, one or more destination IP addresses, or one or more destination ports) corresponding to rule 5 310. Responsive to determining that the portion of received packets have packet header field values that do not correspond to the packet filtering rule, one or more additional packet filtering rules may be applied to the one or more of the portion of the received packets. For example, rule 7 314 may be applied to the portion of received packets that do not have packet header field values that correspond to rule 5 310 (e.g., each of the portion of the received packets may be blocked from continuing toward their respective destinations). The method may then return to step 400 and await receipt of one or more additional packets (e.g., one or more additional packets from network 104 received via network interface 208 that are destined for network 106).

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASIC s), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional.

What is claimed is:

1. A method comprising:
receiving, by a computing platform via a communication interface and from a protected network, a plurality of outbound packets, wherein the computing platform protects the protected network from exfiltration of data;
determining, based on the plurality of outbound packets originating from within the protected network and based on a destination address of each of a first portion of the plurality of outbound packets indicating that the first portion of the plurality of outbound packets are destined for a second network outside the protected network, that the first portion of the plurality of outbound packets comprise one or more packet header field values that correspond to a first packet-filtering rule;
responsive to the determining that the first portion of the plurality of outbound packets comprise one or more packet header field values that correspond to the first packet-filtering rule, determining that at least one packet of the first portion of the plurality of outbound packets comprises application layer packet header field values comprising at least one transport layer security (TLS)-version value that corresponds to the first packet-filtering rule;
applying, by the computing platform, at least one first packet transformation function, defined by the first packet-filtering rule, to block the at least one packet of the first portion of the plurality of outbound packets from continuing toward the second network based on a determination that a first TLS-version value associated with the at least one packet is associated with a security vulnerability; and
applying, by the computing platform, at least one second packet transformation function, defined by the first packet-filtering rule, to allow at least one other packet of the first portion of the plurality of outbound packets to be forwarded to the second network based on a determination that a second TLS-version value associated with the at least one other packet is not associated with a security vulnerability.

2. The method of claim 1, further comprising:
determining a second destination address of each of a second portion of the plurality of outbound packets, wherein the second destination address comprises a trusted network; and
applying at least one third packet transformation function, defined by a second packet-filtering rule, to forward each of the second portion of the plurality of outbound packets toward the second destination address.

3. The method of claim 1, further comprising:
determining a second destination address of each of a second portion of the plurality of outbound packets, wherein the second destination address comprises an untrusted network; and
applying at least one third packet transformation function, defined by a second packet-filtering rule, to drop each of the second portion of the plurality of outbound packets.

4. The method of claim 1, further comprising:
receiving, from a security policy management server, a dynamic security policy that comprises a set of packet-filtering rules.

5. The method of claim 4, wherein the security policy management server is external to the protected network.

6. The method of claim 1, wherein the applying at least one first packet transformation function to block the at least one packet is further based on a determination that the at least one packet comprises data corresponding to at least one of a hypertext transfer protocol (HTTP) PUT method, an HTTP POST method, an HTTP DELETE method, or an HTTP CONNECT method.

7. A packet security gateway that interfaces at a boundary of a protected network, the packet security gateway comprising:
one or more processors; and
memory comprising instructions that, when executed by the one or more processors, cause the packet security gateway to:
receive, via a communication interface and from the protected network, a plurality of outbound packets, wherein the packet security gateway protects the protected network from exfiltration of data;
determine, based on the plurality of outbound packets originating from within the protected network and based on a destination address of each of a first portion of the plurality of outbound packets indicating that the first portion of the plurality of outbound packets are destined for a second network outside the protected network, that the first portion of the plurality of outbound packets comprise one or more packet header field values that correspond to a first packet-filtering rule;

responsive to a determination that the first portion of the plurality of outbound packets comprise one or more packet header field values that correspond to the first packet-filtering rule, determine that at least one packet of the first portion of the plurality of outbound packets comprises application layer packet header field values comprising at least one transport layer security (TLS)-version value that corresponds to the first packet-filtering rule;

apply at least one first packet transformation function, defined by the first packet-filtering rule, to block the at least one packet of the first portion of the plurality of outbound packets from continuing toward the second network based on a determination that a first TLS-version value associated with the at least one packet is associated with a security vulnerability; and apply at least one second packet transformation function, defined by the first packet-filtering rule, to allow at least one other packet of the first portion of the plurality of outbound packets to be forwarded to the second network based on a determination that a second TLS-version value associated with the at least one other packet is not associated with a security vulnerability.

8. The packet security gateway of claim 7, wherein the instructions, when executed by the one or more processors, cause the packet security gateway to:

determine a second destination address of each of a second portion of the plurality of outbound packets, wherein the second destination address comprises a trusted network; and apply at least one third packet transformation function, defined by a second packet-filtering rule, to forward each of the second portion of the plurality of outbound packets toward the second destination address.

9. The packet security gateway of claim 7, wherein the instructions, when executed by the one or more processors, cause the packet security gateway to:

determine a second destination address of each of a second portion of the plurality of outbound packets, wherein the second destination address comprises an untrusted network; and apply at least one third packet transformation function, defined by a second packet-filtering rule, to drop each of the second portion of the plurality of outbound packets.

10. The packet security gateway of claim 7, wherein the instructions, when executed by the one or more processors, cause the packet security gateway to:

receive, from a security policy management server, a dynamic security policy that comprises a set of packet-filtering rules.

11. The packet security gateway of claim 10, wherein security policy management server is external to the protected network.

12. The packet security gateway of claim 7, wherein the instructions to apply the at least one first packet transformation function to block the at least one packet further comprise a determination that the at least one packet comprises data corresponding to at least one of a hypertext transfer protocol (HTTP) PUT method, an HTTP POST method, an HTTP DELETE method, or an HTTP CONNECT method.

13. One or more non-transitory computer-readable media comprising instructions that, when executed by one or more processors of a packet security gateway that interfaces at a boundary of a protected network, cause the packet security gateway to:

receive, via a communication interface and from the protected network, a plurality of outbound packets, wherein the packet security gateway protects the protected network from exfiltration of data;

determine, based on the plurality of outbound packets originating from within the protected network and based on a destination address of each of a first portion of the plurality of outbound packets indicating that the first portion of the plurality of outbound packets are destined for a second network outside the protected network, that the first portion of the plurality of outbound packets comprise one or more packet header field values that correspond to a first packet-filtering rule;

responsive to a determination that the first portion of the plurality of outbound packets comprise one or more packet header field values that correspond to the first packet-filtering rule, determine that at least one packet of the first portion of the plurality of outbound packets comprises application layer packet header field values comprising at least one transport layer security (TLS)-version value that corresponds to the first packet-filtering rule;

apply at least one first packet transformation function, defined by the first packet-filtering rule, to block the at least one packet of the first portion of the plurality of outbound packets from continuing toward the second network based on a determination that a first TLS-version value associated with the at least one packet is associated with a security vulnerability; and apply at least one second packet transformation function, defined by the first packet-filtering rule, to allow at least one other packet of the first portion of the plurality of outbound packets to be forwarded to the second network based on a determination that a second TLS-version value associated with the at least one other packet is not associated with a security vulnerability.

14. The one or more non-transitory computer-readable media of claim 13, wherein the instructions, when executed by the one or more processors, cause the packet security gateway to:

determine a second destination address of each of a second portion of the plurality of outbound packets, wherein the second destination address comprises a trusted network; and apply at least one third packet transformation function, defined by a second packet-filtering rule, to forward each of the second portion of the plurality of outbound packets toward the second destination address.

15. The one or more non-transitory computer-readable media of claim 13, wherein the instructions, when executed by the one or more processors, cause the packet security gateway to:

determine a second destination address of each of a second portion of the plurality of outbound packets, wherein the second destination address comprises an untrusted network; and apply at least one third packet transformation function, defined by a second packet-filtering rule, to drop each of the second portion of the plurality of outbound packets.

16. The one or more non-transitory computer-readable media of claim 13, wherein the instructions, when executed by the one or more processors, cause the packet security gateway to:
receive, from a security policy management server, a dynamic security policy that comprises a set of packet-filtering rules.

17. The one or more non-transitory computer-readable media of claim 16, wherein the security policy management server is external to the protected network.

18. The one or more non-transitory computer-readable media of claim 13, wherein the instructions to apply the at least one first packet transformation function to block the at least one packet further comprise a determination that the at least one packet comprises data corresponding to at least one of a hypertext transfer protocol (HTTP) PUT method, an HTTP POST method, an HTTP DELETE method, or an HTTP CONNECT method.

19. The method of claim 1, wherein the application layer packet header field values are located in an unencrypted TLS record protocol header.

20. The packet security gateway of claim 7, the application layer packet header field values are located in an unencrypted TLS record protocol header.

21. The one or more non-transitory computer-readable media of claim 13, the application layer packet header field values are located in an unencrypted TLS record protocol header.

* * * * *

UNITED STATES PATENT AND TRADEMARK OFFICE
CERTIFICATE OF CORRECTION

PATENT NO. : 11,418,487 B2
APPLICATION NO. : 17/246854
DATED : August 16, 2022
INVENTOR(S) : Moore et al.

It is certified that error appears in the above-identified patent and that said Letters Patent is hereby corrected as shown below:

On the Title Page

Page 7, Column 1, Other Publications Line 47:
Delete "Reporton" and insert --Report on-- therefor Page 7, Column 1, Other Publications Line 69:
Delete "Exhiibit" and insert --Exhibit-- therefor Page 8, Column 1, Other Publications Line 16:
Delete "Reivew" and insert --Review-- therefor Signed and Sealed this
Twenty-second Day of November, 2022

Katherine Kelly Vidal
*Director of the United States Patent and Trademark Office*